Sheet 1-2 Sheets.
J. S. Marsh.
Harvester Rake.
N° 1371
N° 32375
Patented May 21, 1861
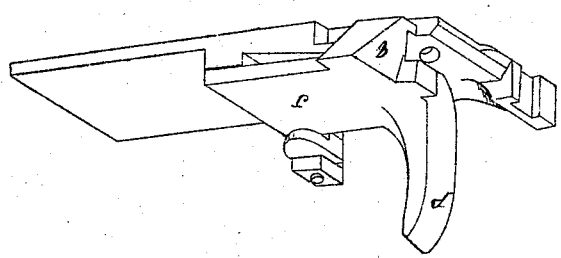
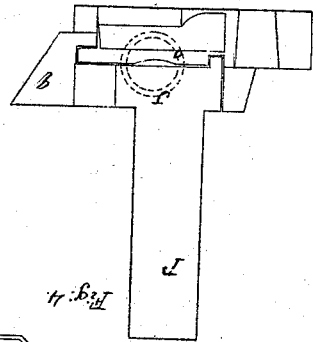
Fig. 5.    Fig. 4.
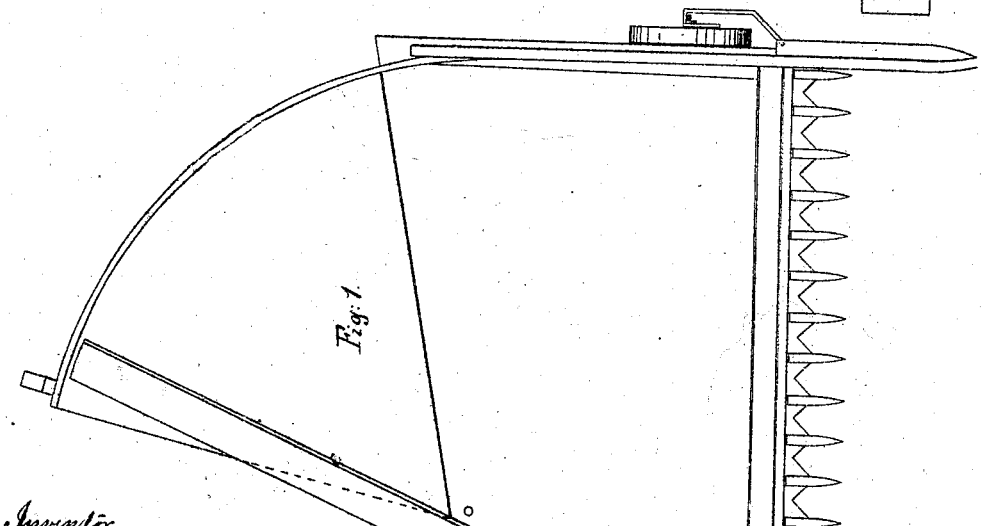
Fig. 1.
Inventor
James S. Marsh
by Robt. W. Fenwick
Attorney
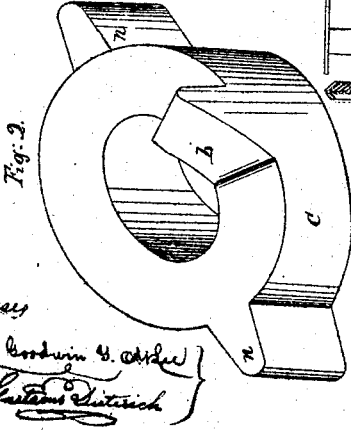
Fig. 2.
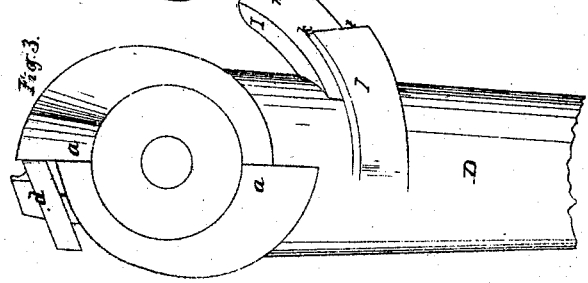
Fig. 3.
Witness
Goodwin Y. Atlee
Gustavus Dieterich

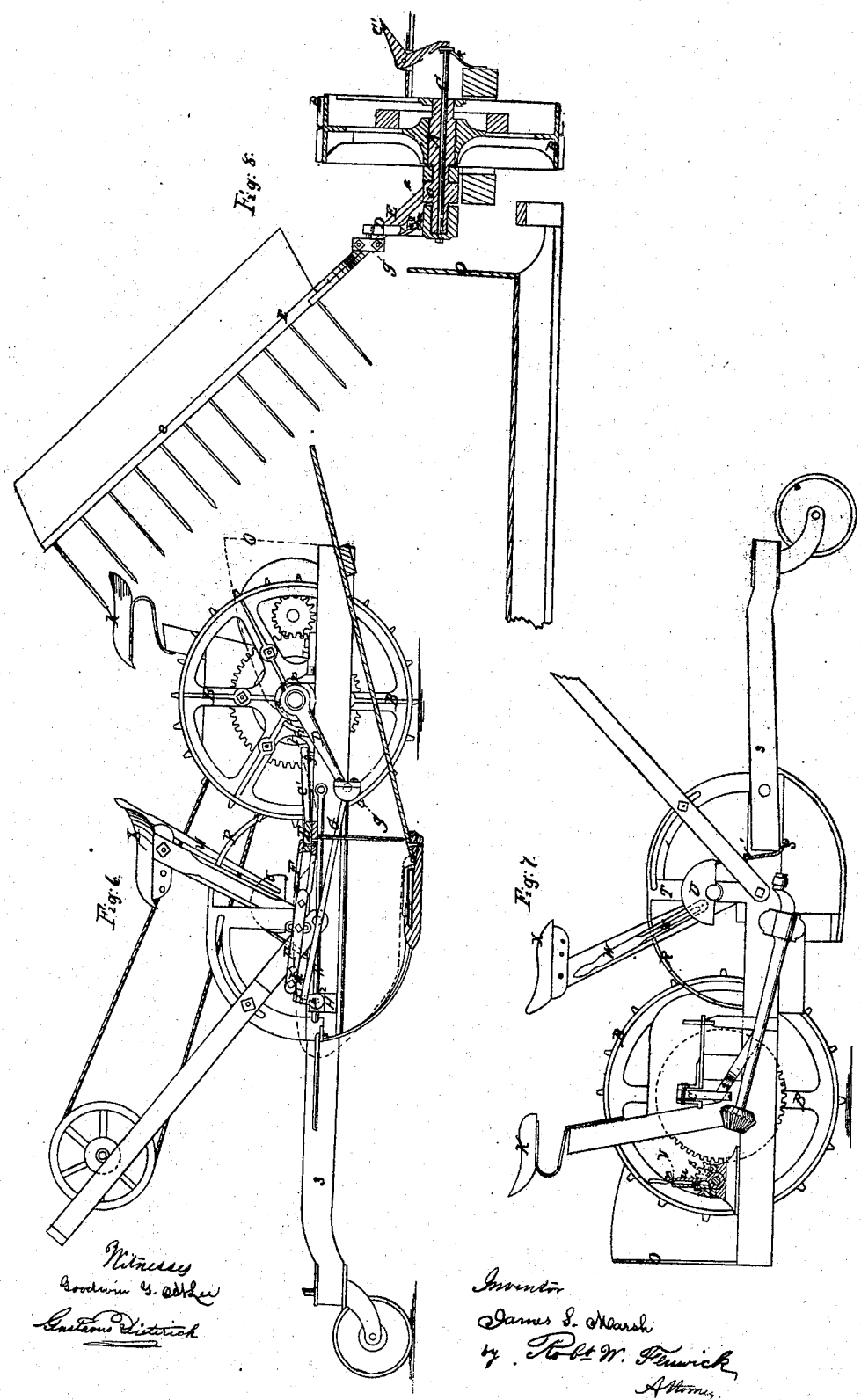

UNITED STATES PATENT OFFICE.

JAMES S. MARSH, OF LEWISBURG, PENNSYLVANIA.

IMPROVEMENT IN HARVESTERS.

Specification forming part of Letters Patent No. 32,375, dated May 21, 1861.

*To all whom it may concern:*

Be it known that I, JAMES S. MARSH, of Lewisburg, in the county of Union and State of Pennsylvania, have invented a new and useful Improvement in Self-Raking Harvesters; and I do hereby declare that the following is a full, clear, and exact description of the same, reference being had to the accompanying drawings, forming a part of this specification, in which—

Figure 1 is a plan or top view of a harvester with my improvements applied to it. Figs. 2, 3, 4, and 5 are views of detached portions of the raking contrivance. Fig. 6 is a vertical longitudinal section of the harvester, looking from the grain side of the platform. Fig. 7 is a similar section from the driving-wheel side of the machine. Fig. 8 is a transverse section in the line of the axis of the driving-wheel.

Similar letters of reference in each of the several figures indicate corresponding parts.

My invention relates, first, to an arrangement of raking device; second, to an arrangement of lever for throwing the machine out of gear; and, third, to an arrangement for adjusting the harvester.

The cutting apparatus, draft-frame, gearing, and platform of my harvester are similar in construction to harvesters in use, and therefore need not here be described, except as connected with my improvements.

My first improvement is as follows: The shaft or axle A of the driving-wheel B is hollow, and a sliding rod, C, with a treadle, C', on its outer end is passed through the same, said rod extending through a spring, 2, and entirely through the axle, and having attached to its inner end a crank-arm, D, which has two inclined teeth, *a*, formed on the inner face of its box or eye, so that they may gear alternately at each half-revolution with a similar inclined tooth, *b*, formed on the shoulder *c* of the axle of the driving-wheel. The crank-arm is supported on that part of the hollow axle which extends beyond the shoulder *c*, as represented in Fig. 8. There is a third adjustable inclined tooth, *d*, attached to the box or eye of the crank-arm, in order that the movements of the rake-head may be changed accordingly as the grain being cut requires to insure its delivery in sheaves of uniform size. The rake-head E is made of an angular form, and the long end *e* thereof has the teeth set in its under side and a canvas guard attached to its upper side, while the short end *e'* reaches nearly to the front side of the axle of the driving-wheel, and attached by means of a ball-joint to a vertical support or standard, *f*, of the draft-frame, as represented. To the corner or angle of the rake-arm a connecting-link, F, attaches by a pivot, and to the wrist-pin of the crank-arm D a pitman, G, attaches by means of a ball-joint, *g*, and to the other end of said pitman the front end of the connecting-link F attaches by a ball-joint, *h*, as represented. The pitman has its support, or a horizontal guide rod or way, H', arranged on the side of the draft-frame and forward of the driving-wheel axle, being connected to a traversing slide, H', of the same by means of a double joint, *i j*, as represented. On the back edge of the crank-arm a cam-shaped projection, I, is formed, said projection extending in an oblique direction toward the face of the driving-wheel, and being so shaped that it presents a lateral stop, *k*, and a back stop, *l*, and at the same time presents an incline or cam-shaped surface, *m*. In connection with the cam projection just described and lugs *n n* on the circumference of the shoulder of the hollow axle a sliding plate, J, is employed, said plate being arranged in rear of the hollow axle A on guideway L of the draft-frame, so as to move back against a spring, *o*, when pressure is brought to bear against it, and to fly forward automatically when the pressure is withdrawn. Projecting up from the end of the plate J there is a vertical lug, *p*, and from the side near the front end of the plate there projects a lug, *q*, which is inclined on its side edge in the manner represented. This plate is only used when it is desired not to have the rake sweep off a bundle at every single turn of the wheel. When it is desired not to have the plate operate, it is locked back or removed. In order to guide the rake and support it at the extremity of its forward movement, the inner guard, O, is hollowed out or curved, as represented.

The operation of the raking device is as follows: Suppose the rake-head to be in its extreme rear position, and the machine just started. The machine traveling forward, the driving-wheel makes a half-revolution before the inclined tooth *b* takes hold of the inclined tooth a of the crank-arm. As soon as the two teeth gear, the rake-head begins to move upward and toward the front edge of the platform, it being elevated in an inclined position, and drawn forward by the crank-arm and pitman until the pitman and crank-arm perform the extent of their back movement, and assume a position just or nearly the converse of that which they occupied when the rake was at its extreme rear position—that is, stands on a line at right angles to a perpendicular, but on the front side of the axle—at which stage the rake-head by its gravity descends, and its teeth stand at right angles to the surface of the platform. At this stage the crank-arm begins to move forward by reason of the second tooth of the crank-arm gearing with the tooth b, and in doing so draws the rake-head over the platform without raising its teeth out of contact therewith until the grain on the platform has been discharged in a gavel off the platform, when it, (the crank,) assisted by the curved guard O, elevates the rake-head above the platform and out of contact with the falling gavel. When it is desired to have the driving-wheel perform one revolution and a half before the rake sweeps off a gavel of grain, the sliding plate J is adjusted so as to be struck by the lugs n of the axle and the cam projection I of the crank-arm during the operation. It will be seen that as the axle revolves, the inclined surface m of the cam I comes in contact with the inclined surface of the lug q, and as the lug q cannot yield laterally the crank-arm must do so, and therefore its tooth a is thrown out of gear with the tooth b of the axle, and the connection between the axle and crank-arm thus destroyed, and the rake is left stationary until the tooth b again comes round and gears with the tooth a. It should be here observed that immediately after the connection between the rake and axle ceases, one of the lugs n of the axle strikes the lug q, and throws the plate I back a sufficient distance to allow the cam projection, with its stops k and l, to move inward laterally a distance sufficient to insure a regearing with the axle at the proper period, and as soon as this occurs the spring o returns the plate to its original position, and said plate in coming back suddenly arrests the crank in a retrograde movement, which always take place just at this stage of the operation on account of its gravity. The operation continuing, the tooth b comes around and regears with the crank-arm and moves the rake upward and forward, and also again back over the platform with the gavel of grain in the same manner as before described. When it is desired to have the driving-wheel perform two revolutions and the rake to only sweep the platform once during the same period, the second inclined tooth, d, is turned from the position shown in red lines to the position shown in black lines. By thus adjusting the tooth d it acts as a stop to prevent the teeth a a from regearing with the tooth b after the disconnection has been effected by the cam projection I, and until the driving-wheel has made two revolutions. In all other respects the operation of the rake is the same as before described. Whenever it is desired to stop the rake entirely, or for a longer period than heretofore named, all that the driver is required to do is to hold his foot down upon the treadle C'. This operation causes the rod C to throw the crank-arm out of gear with the axle. The flat or spiral spring 2 returns the shaft to its proper position when the treadle is released.

My second improvement is as follows: In rear of the support of the driver's seat K an angular casting, L, is arranged. This casting has a stop projection, V, cast on its front side, and also a straight slot, r, in its upper portion. Through the base of the casting another straight slot, s, is formed, and from one side of this slot an ear, t, projects upward. The base of the casting forms the upper half of the box for the shaft which carries the pinion that gears with the driving-wheel. Through the slots r and s of the casting a vertical lever, u, plays freely, said lever having a forked clutch on its lower end, so as to take hold of the shaft of the pinion, and being made flexible between its fulcrum and its upper end, so as to have in itself the properties of a spring-catch. With this arrangement the driver while sitting on his seat, by shifting the lever to the right or left in the upper slot and slightly forward, can readily throw out and in gear the large bevel-wheel which actuates the pinion of the crank-shaft of the cutter-bar, and retain the connection or disconnection without otherwise manipulating with the lever.

My third improvement is as follows: On the outer side of the draft-frame and near the front end a ratchet-arc, R, is arranged, and on one of the standards T of the reel-support a segment of a grooved pulley, U, is hung, and from this pulley a cord or chain, V', passes down and attaches to the rear end of the short tongue 3, by which the harvester is adjusted. To one side of the pulley a hand-lever, W, is pivoted, and between the pulley and the lever W a flat spring, x, is arranged, said spring having its support on the lever. With this arrangement the driver can, while sitting upon the raker-seat X, readily adjust the harvester, and after the adjustment is made no care is necessary on his part to insure its retention in the position to which it has been adjusted, for the spring x holds the lever W in one or other of the ratchet-recesses of the arc R, as represented.

What I claim as my invention, and desire to secure by Letters Patent, is—

1. Combining with an automatic harvester-rake and harvester, devices, substantially such as herein described, whereby the rake is caused automatically to ungear with the axle of the driving-wheel when the parts are adjusted to allow the driving-wheel to make more than one revolution, for the purpose set forth, substantially as described.

2. The arrangement of the angular rake-head E $e\ e'$, jointed at one end to a fixed standard, $f$, the crank D, pitman G, connecting-link F, transversing slide H', and guideway H, for joint operation, as described, and whereby the rake has the necessary movements upward in an inclining position and back and forth relatively to the platform, substantially as set forth.

3. The combination, with the hollow axle A of the driving-wheel, of the sliding rod of the crank-shaft, substantially in the manner and for the purpose described.

4. Pivoting the lever W to the segment grooved pulley U, in combination with the flat spring X, bearing against the pulley U, and with the ratchet-toothed arc R and the short tongue 3, in the manner herein described.

5. The casting L, forming the upper half of the box of the pinion-shaft, and the standard guide and stop, as described, in combination with the pinion-shaft and with the lever $u$, forming a clutch and a spring-catch, in the manner and for the purpose described.

JAMES S. MARSH.

Witnesses:
GOODWIN Y. ATLEE,
GUSTAVUS DIETERICH.